G. B. CLARKE.
PLOWS.
No. 190,826. Patented May 15, 1877.
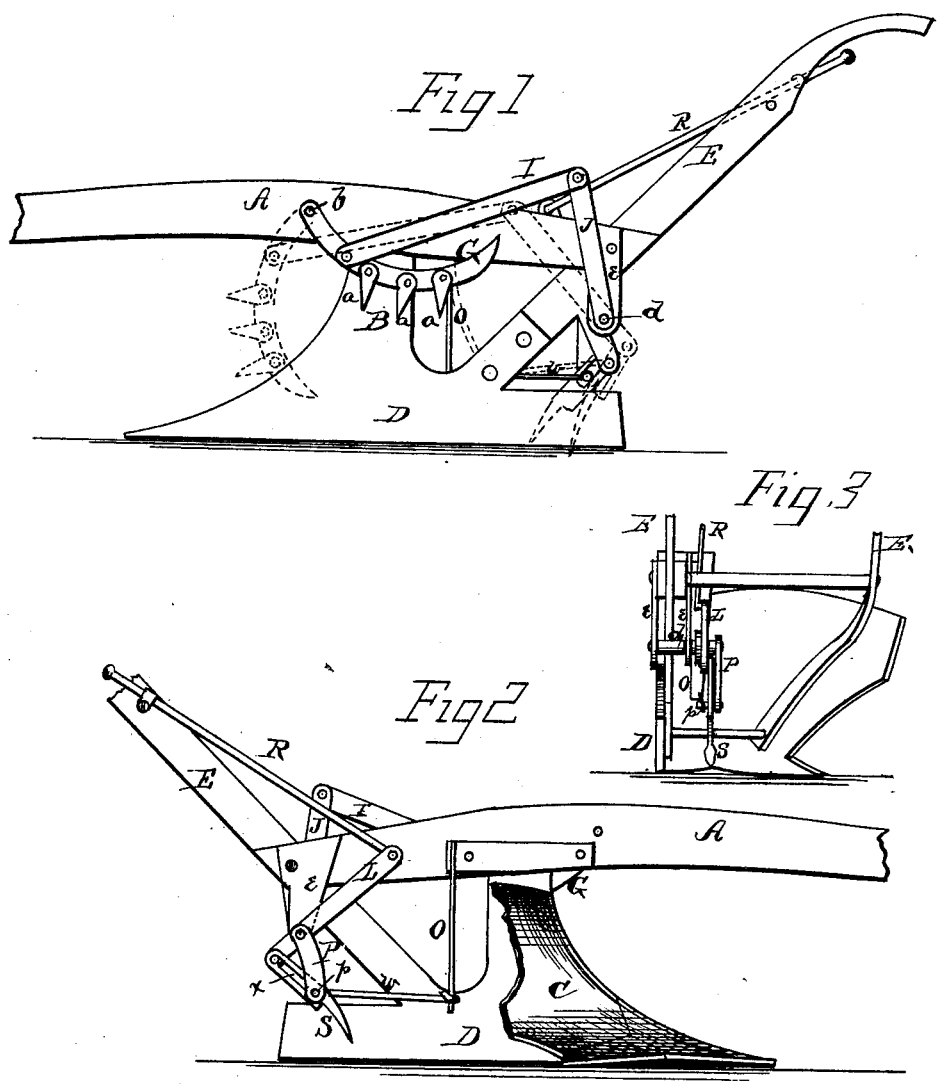

UNITED STATES PATENT OFFICE.

GEORGE B. CLARKE, OF LEONARDSVILLE, NEW YORK.

IMPROVEMENT IN PLOWS.

Specification forming part of Letters Patent No. 190,826, dated May 15, 1877; application filed March 31, 1877.

*To all whom it may concern:*

Be it known that I, GEORGE B. CLARKE, of Leonardsville, in the county of Madison and State of New York, have invented certain new and useful Improvements in Plows; and I do hereby declare that the following is a full, clear, and exact description thereof, reference being had to the accompanying drawings, and to the letters of reference marked thereon, which form part of this specification.

The nature of my invention consists in the construction and arrangement of an attachment for plows, whereby the plow may be freed from obstructions, while it is in operation, by the draft of the team alone, as will be hereinafter more fully set forth.

In order to enable others skilled in the art to which my invention appertains to make and use the same, I will now proceed to describe its construction and operation, referring to the annexed drawing, in which—

Figure 1 is a side elevation from the land-side of a plow embodying my invention. Fig. 2 is a similar view of the same from the mold-board side. Fig. 3 is a rear view.

A represents the beam, B the standard, C the mold-board, and D the land-side, of a plow of any suitable construction.

E E are the handles of the plow, connected by rounds or cross-bars, in the usual way.

$a$ $a$ represent clearing-teeth—one, two, or more—loosely pivoted to a carrying-lever, G, having its fulcrum at $b$, forward of the king-bolt, on the land-side of the plow-beam A. These clearing teeth or points yield to any obstruction, and slide over it in the backward movement of the lever; but in the forward motion downward of the same they sit in the clogging matter, such as stubble, sods, vines, or roots, and carry such matter forward and upward until the movement of the lever is reversed to a backward movement, when the plow-handles may be turned to the left, and the plow will pass by the obstructions, leaving them on the right side of the plow.

The carrying-lever G is, by a pivoted bar, I, connected with an arm, J, attached to a shaft, $d$, which has its bearings in plates $e$ $e$, secured to and depending from the plow-beam. On the inner end of the shaft $d$ is pivoted a lever, L, the upper end of which has the operating-rod R attached to it. To the lower end of the lever L is pivoted a spur, S, which has a longitudinal slot, $x$, passing over a pin, $p$, projecting from an arm, P, secured on the shaft $d$. The pin $p$ is, by a wire, $w$, connected with a spring, O, as shown in Fig. 2.

The plowman draws the rod R toward him, which turns the lever L on the shaft $d$, so as to force the spur S down into the ground; and as the team advances, the spur, by means of the pin $p$ and arm P, turns the shaft $d$, whereby the lever G, with its clearing teeth or points $a$, is thrown forward and upward, as above described, to remove the obstructions.

By pushing forward the rod R the spur S is drawn out of the ground, and the spring O at once returns the parts to their former position.

This attachment may be applied to any ordinary plow.

Having thus fully described my invention, what I claim as new, and desire to secure by Letters Patent, is—

1. The pivoted lever G, provided with the pivoted clearing teeth or points $a$, in combination with a spur, arranged to be forced into the ground, whereby the draft of the team causes said lever to be thrown forward and upward, substantially as herein set forth.

2. The combination of the lever G with clearing-points $a$, connecting-bar I, shaft $d$, with arms J P, the spur S, and pin $p$, substantially as and for the purposes herein set forth.

3. The combination of the rod R, loose lever L, slotted spur S, and shaft $d$ with arm P, having pin $p$, substantially as and for the purposes herein set forth.

4. The combination of the lever G with clearing-points $a$, connecting parts I J, shaft $d$, with arm P, having pin $p$, the spur S, connecting-wire $w$, and the spring O, all constructed and arranged to operate substantially as and for the purposes herein set forth.

In testimony that I claim the foregoing as my own I affix my signature in presence of two witnesses.

GEORGE B. CLARKE.

Witnesses:
 HENRY W. WORTH,
 A. B. SPAULDING.